(12) United States Patent
Shie et al.

(10) Patent No.: US 12,604,124 B2
(45) Date of Patent: Apr. 14, 2026

(54) EARBUD WITH A BUILT-IN THERMOMETER

(71) Applicants:Precision Sensors Design Inc., Hukou Township (TW); Jin-Shown Shie, Baoshan Township (TW)

(72) Inventors: Jin-Shown Shie, Baoshan Township (TW); Ou-Chi Chen, Hsinchu City (TW); Tai-Yan Kam, Hsinchu City (TW); Ko-Ping Chung, Hsinchu City (TW)

(73) Assignees: PRECISION SENSORS DESIGN INC., Hsinchu (TW); Jin-Shown Shie, Hsinchu (TW)

( * ) Notice: Subject to any disclaimer, the term of this patent is extended or adjusted under 35 U.S.C. 154(b) by 364 days.

(21) Appl. No.: 18/320,889

(22) Filed: May 19, 2023

(65) Prior Publication Data

US 2024/0388824 A1     Nov. 21, 2024

(51) Int. Cl.
| | |
|---|---|
| *G01J 5/0802* | (2022.01) |
| *G01J 5/00* | (2022.01) |
| *G01J 5/04* | (2006.01) |
| *G01J 5/0818* | (2022.01) |
| *H04R 1/02* | (2006.01) |
| *H04R 1/10* | (2006.01) |

(52) U.S. Cl.
CPC ............ *H04R 1/028* (2013.01); *G01J 5/0011* (2013.01); *G01J 5/041* (2013.01); *G01J 5/0802* (2022.01); *G01J 5/0818* (2013.01); *H04R 1/1016* (2013.01)

(58) Field of Classification Search
CPC ..... H04R 1/028; H04R 1/1016; G01J 5/0011; G01J 5/041; G01J 5/0802; G01J 5/0818
See application file for complete search history.

(56) References Cited

U.S. PATENT DOCUMENTS

2019/0033505 A1* 1/2019 Cross .................... A61B 5/742

FOREIGN PATENT DOCUMENTS

WO    WO-2020122181 A1 *  6/2020  ................ G01J 5/00
WO    WO-2022213346 A1 * 10/2022  ........... H04R 1/1091

* cited by examiner

*Primary Examiner* — Peter J Macchiarolo
*Assistant Examiner* — Mireille S Sadate-Moualeu
(74) *Attorney, Agent, or Firm* — HSML P.C.

(57) ABSTRACT

An earbud includes a housing, a thermometer module and a speaker module. The housing defines a passageway having a passageway opening. The thermometer module is disposed in the housing, and receives infrared radiation from an eardrum via the passageway. The speaker module is disposed in the housing, and is operable to generate sound waves that travel through the passageway toward the eardrum. The speaker module cooperates with the housing and the thermometer module to define an infrared radiation path and a sound wave path within the passageway that are separated from each other and that are for the infrared radiation from the eardrum and the sound waves generated by the speaker module to respectively travel therethrough.

14 Claims, 5 Drawing Sheets

EARBUD WITH A BUILT-IN THERMOMETER

FIELD

The disclosure relates to an earbud, and more particularly to an earbud with a built-in thermometer.

BACKGROUND

Referring to FIG. 1, a conventional earbud includes a front housing 11, a rear housing 12, a speaker 13, a battery 14 and a jacket 15. The front housing 11 is connected to the rear housing 12, and has a main portion 111 that cooperates with the rear housing 12 to define a cavity 10, and a neck portion 112 that is connected to the main portion 111. The neck portion 112 defines a sound passageway 113 therein that is in spatial communication with the cavity 10 and that has an opening distal from the cavity 10. The speaker 13 is disposed in cavity 10, and generates sound waves that travel through the sound passageway 113. The battery 14 is disposed in the cavity 10, and is electrically coupled to the speaker 13. The jacket 15 is mounted to a distal end of the neck portion 112 of the front housing 11.

Recently, an earbud may be asked to provide extra functions. For example, in addition to outputting sound waves, an earbud may be equipped with a built-in tympanic temperature sensor which receives infrared radiation from the eardrum of a user to monitor body temperature of the user.

However, if the tympanic temperature sensor is disposed in the sound passageway 113, the sound waves traveling through the sound passageway 113 may be obstructed by the tympanic temperature sensor, so sound quality of the earbud may be adversely affected.

If the tympanic temperature sensor is disposed in the cavity 10 in order not to obstruct the sound passageway 113, the tympanic temperature sensor is distal from the opening of the sound passageway 113 through which the infrared radiation from the eardrum enters the cavity 10. Thus, the tympanic temperature sensor may receive a great amount of radiation irrelevant to the eardrum temperature, such as infrared radiation from an inner wall of the neck portion 112 of the front housing 11, so the body temperature of the user may be inaccurately determined.

SUMMARY

Therefore, an object of the disclosure is to provide an earbud that can alleviate at least one of the drawbacks of the prior art.

According to the disclosure, the earbud is adapted to be inserted into an ear canal of a user, and includes a housing, a thermometer module and a speaker module. The housing defines a cavity and a passageway therein. The passageway is in spatial communication with the cavity, and has a passageway opening that is distal from the cavity and that is in spatial communication with the ear canal. The thermometer module is disposed in the housing, and is adapted to receive infrared radiation from an eardrum of the user via the passageway to determine a body temperature of the user. The speaker module is disposed in the housing, and is operable to generate sound waves that travel through the passageway toward the eardrum. The speaker module cooperates with the housing and the thermometer module to define an infrared radiation path and a sound wave path within the passageway that are separated from each other and that are for the infrared radiation from the eardrum and the sound waves generated by the speaker module to respectively travel therethrough.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
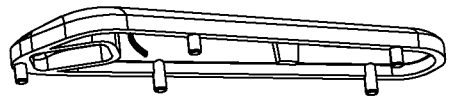
FIG. 1 is an exploded perspective view illustrating a conventional earbud.
Figure 1:
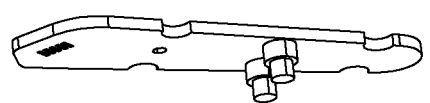
Figure 1:
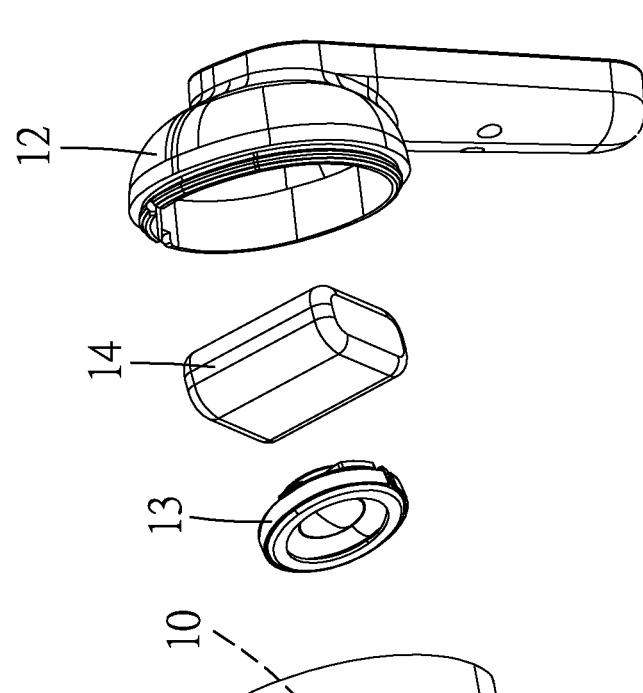
Figure 1:
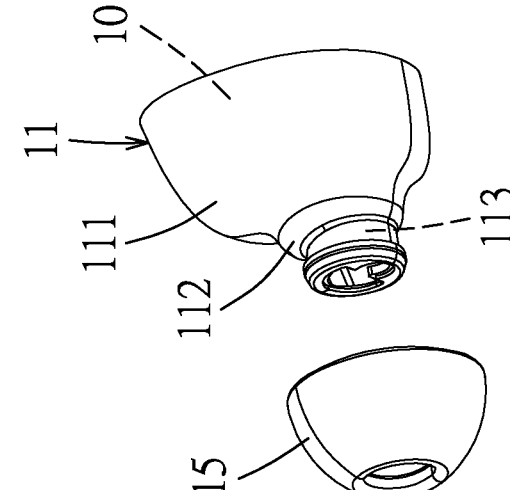

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly," "front," "rear" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
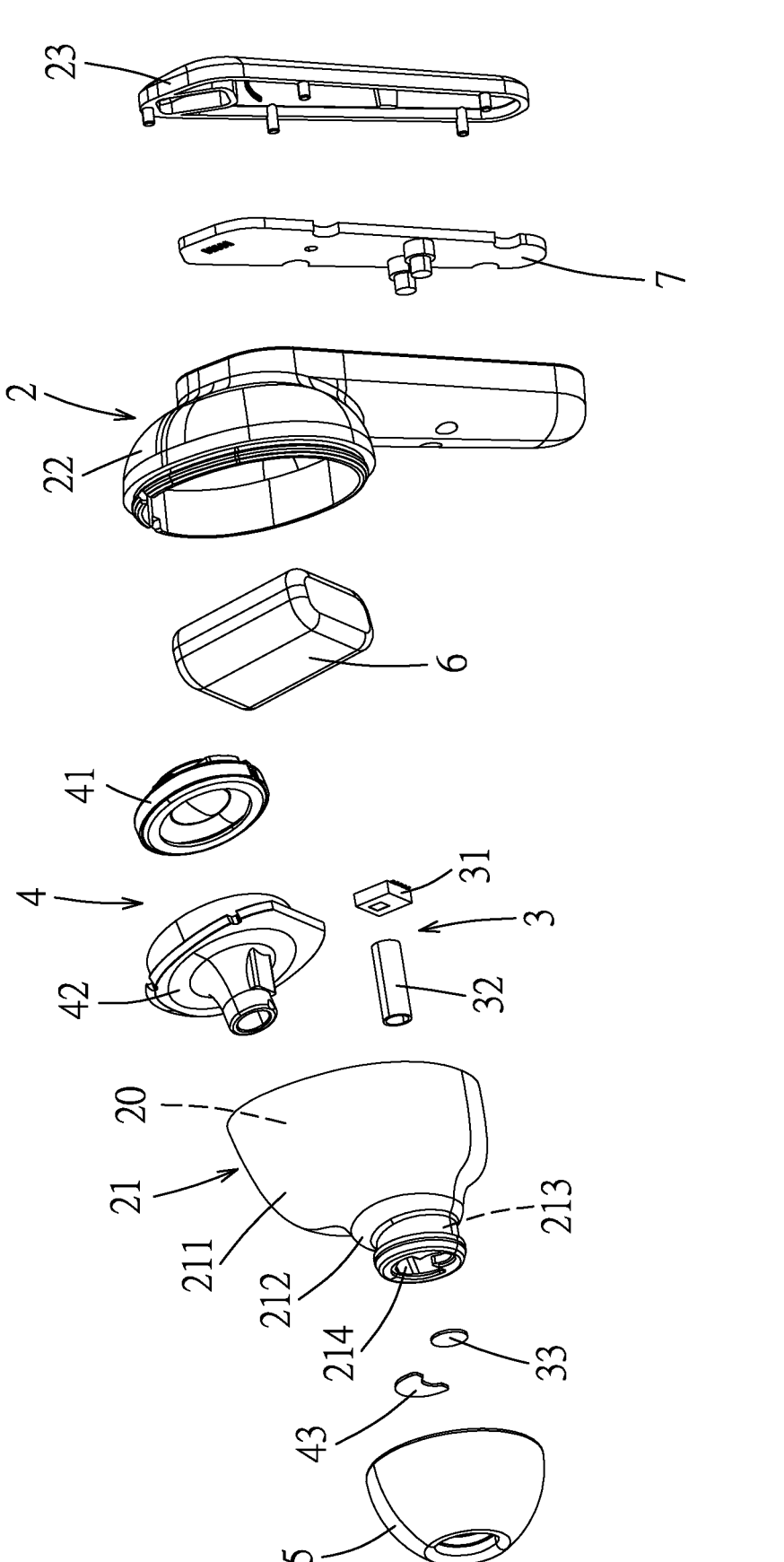
FIG. 2 is an exploded perspective view illustrating an embodiment of an earbud according to the disclosure.
Figure 3:
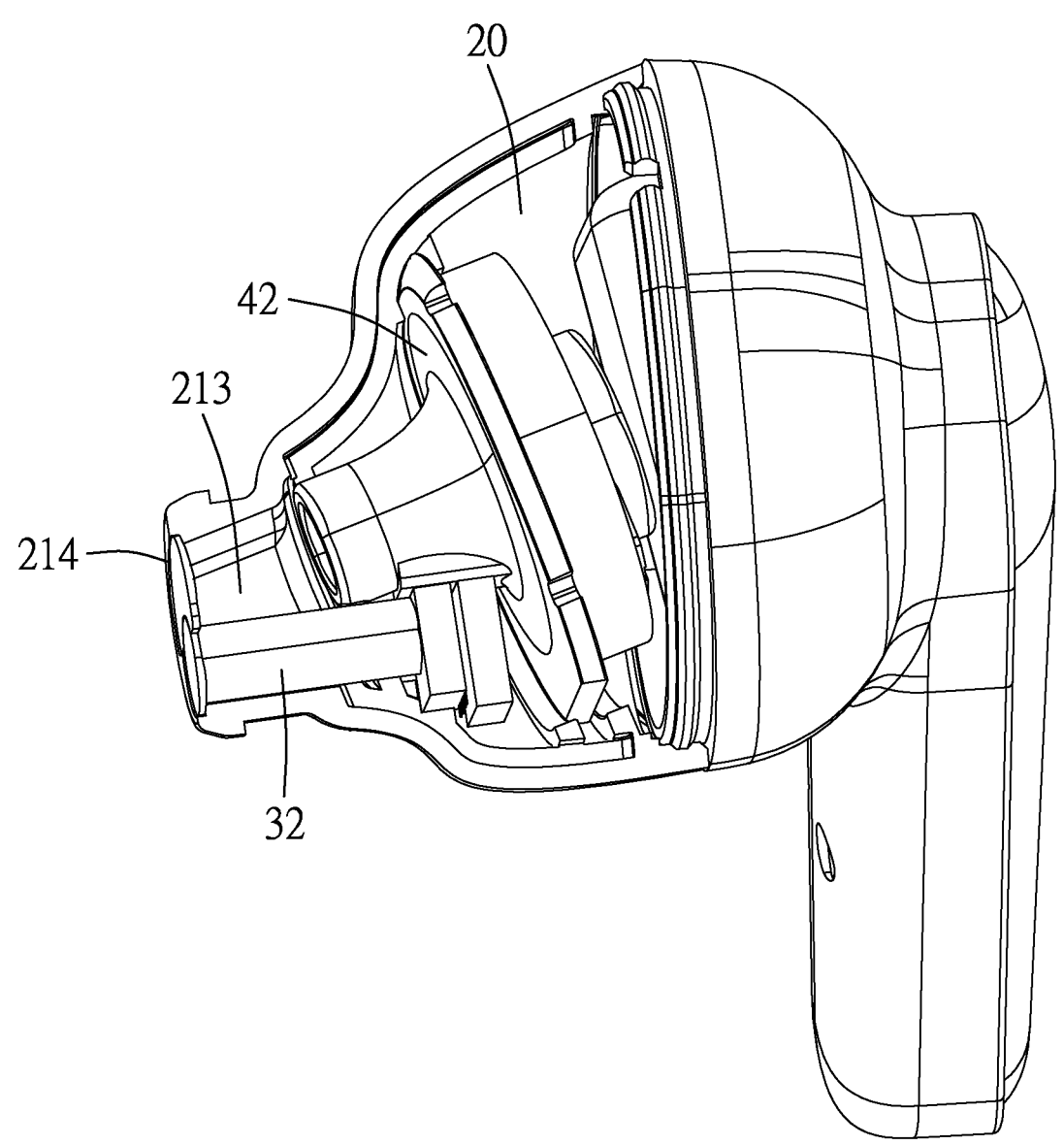
FIG. 3 is a perspective view of the embodiment, omitting a portion of a front housing of the embodiment.

Referring to FIGS. 2 and 3, an embodiment of an earbud according to the disclosure includes a housing 2, a thermometer module 3 and a speaker module 4. The thermometer module 3 and the speaker module 4 are disposed in the housing 2.

In this embodiment, the housing 2 includes a front housing part 21, a rear housing part 22 and a back cover 23. The front housing part 21 is connected to the rear housing part 22, and has a main portion 211 that cooperates with the rear housing part 22 to define a cavity 20, and a neck portion 212 that extends forwardly from the main portion 211. The neck portion 212 tapers away from the main portion 211, and defines a passageway 213 therein that is in spatial communication with the cavity 20 and that has a passageway opening 214 distal from the main portion 211. The back cover 23 is mounted to one side of the rear housing part 22 opposite to the front housing part 21. It should be noted that, in this embodiment, the housing 2 is physically divided into the front housing part 21, the rear housing part 22 and the back cover 23, which are interconnected. However, in one modification, the housing 2 may be physically divided into housing parts different from those of the abovementioned embodiment, or may be integrally formed by using an insert molding technique.

In this embodiment, the thermometer module 3 is configured as a tympanic thermometer which receives infrared radiation from an eardrum of a user to monitor body temperature of the user. The thermometer module 3 includes an infrared sensor 31, an optical waveguide 32 and an infrared filter 33. The infrared sensor 31 is disposed in the cavity 20. The optical waveguide 32 is configured as a tube, and is disposed in the passageway 213. The optical waveguide 32 has an inlet opening that is disposed adjacent to the passageway opening 214 and that permits the infrared radiation from the eardrum to enter the optical waveguide 32 therethrough, and an outlet opening that is distal from the passageway opening 214 and that is covered by the infrared sensor 31. The optical waveguide 32 defines an infrared radiation path therein, is fixed to a radially outer side of the passageway 213, and occupies a minor portion of the passageway 213. The remaining portion of the passageway 213 (i.e., a major portion of the passageway 213) is separated from the infrared radiation path, and serves as a sound wave path. The inlet opening of the optical waveguide 32 occupies a minor portion of the passageway opening 214. An inner surrounding surface of the optical waveguide 32 is gold-plated so as to enhance infrared reflection within the optical waveguide 32. The infrared filter 33 covers the inlet opening of the optical waveguide 32 and prevents contaminants from entering the infrared radiation path and from being attached onto the inner surrounding surface of the optical waveguide 32. In this embodiment, the infrared filter 33 may be made of crystalline silicone or infrared transparent polymer, such as high-density polyethylene (HDPE) that has high transparency with respect to a wave with a wavelength of 10 micrometers.

Since the inlet opening of the optical waveguide 32 is disposed adjacent to the passageway opening 214 and since the outlet opening of the optical waveguide 32 is covered by the infrared sensor 31, radiation irrelevant to the eardrum temperature, such as infrared radiation from the neck portion 212 of the housing 2, may not enter the optical waveguide 32, and the infrared radiation from the eardrum thus may be completely received by the infrared sensor 31, enabling the thermometer module 3 to accurately determine the body temperature of the user. Since the optical waveguide 32 is fixed to a radially outer side of the passageway 213, integrity of the sound wave path is maintained.

Figure 4:
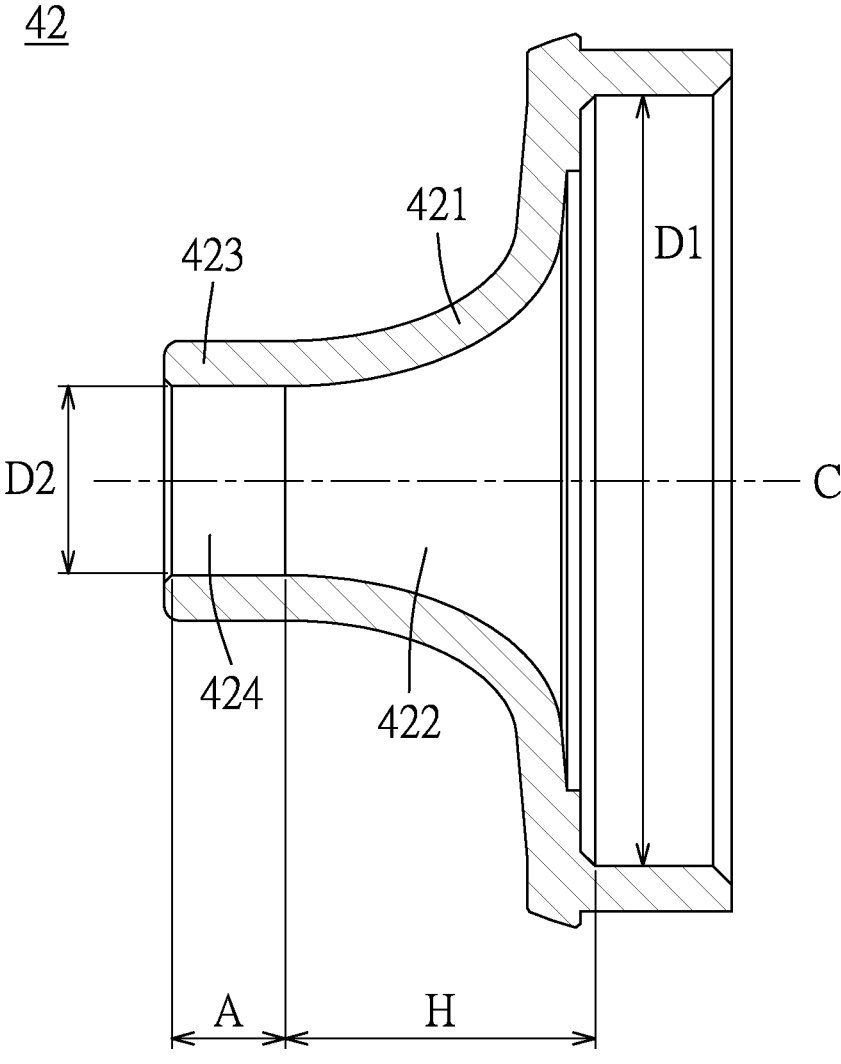
FIG. 4 is a sectional view of a sound waveguide of the embodiment.

The speaker module 4 includes a speaker 41, a sound waveguide 42 and a sound filter 43. The speaker 41 is disposed in the cavity 20. The sound waveguide 42 is substantially disposed in the cavity 20 and extends into the sound wave path. Referring further to FIG. 4, the sound waveguide 42 is funnel-shaped, and has a cone portion 421 and a tube portion 423 connected to the cone portion 421. The cone portion 421 is located in the cavity 20 and tapers toward the passageway 213. The tube portion 423 is connected to a tapered end of the cone portion 421 and extends into the passageway 213. The cone portion 421 of the sound waveguide 42 defines a conical space therein that tapers toward the tube portion 423 and that serves as a sound collection space 422. The sound collection space 422 has an inlet opening that is distal from the tube portion 423 and that resides in a first imaginary plane, and an outlet opening that is proximate to the tube portion 423 and that resides in a second imaginary plane parallel to the first imaginary plane. The tube portion 423 defines a sound output space 424 therein that is in spatial communication with the outlet opening of the sound collection space 422. In one embodiment, a diameter of the inlet opening of the sound collection space 422 is D1, a diameter of the outlet opening of the sound collection space 422 is D2 and is smaller than D1, a distance between the inlet opening and the outlet opening of the sound collection space 422 (i.e., a distance between the first imaginary plane and the second imaginary plane) is H, and a length of the tube portion 423 of the sound waveguide 42 is A. A diameter of the tube portion 423 is equal to the diameter of the outlet opening of the sound collection space 422. In a modification, the inlet opening and the outlet opening of the sound collection space 422 need not necessarily be circular. The geometrical relationship between the inlet opening and the outlet opening of the sound collection space 422 may be deduced by analogy according to the above.

In this embodiment, the sound collection space 422 is axisymmetric, and is symmetric about a central axis (C) that extends through a center of the inlet opening of the sound collection space 422 and a center of the outlet opening of the sound collection space 422 and that is perpendicular to the first imaginary plane and the second imaginary plane. In one modification, the sound collection space 422 may be asymmetric. Specifically, when the sound collection space 422 is asymmetric, a central axis that extends through a center of the inlet opening of the sound collection space 422 and that is perpendicular to the first imaginary plane does not extend through a center of the outlet opening of the sound collection space 422, and a distance between the center of the inlet opening and the center of the outlet opening in a direction perpendicular to the central axis is smaller than one quarter of the diameter of the inlet opening of the sound collection space 422 (D1).

The speaker 41 is fixed to the inlet opening of the sound collection space 422, and has a diameter equal to the diameter of the inlet opening (D1). The speaker 41 is operable to generate sound waves that travel through the sound waveguide 42 and into the sound wave path. The sound filter 43 covers an end of the sound wave path distal from the sound waveguide 42 (i.e., the sound filter 43 covers a portion of the passageway opening 214), and prevents contaminants from entering the sound wave path and from obstructing the sound waves generated by the speaker 41. In one embodiment, the sound filter 43 may be formed with a plurality of miniaturized through holes that permit the sound waves to travel therethrough.

In one embodiment, the earbud may further includes a jacket 5 that is mounted to a distal end of the neck portion 212 of the housing 2. In practice, the neck portion 212 is inserted into the ear canal of the user, and the jacket 5 clings tightly to an inner surrounding surface of the ear canal. The jacket 5 is flexible, and may be made of a foam material.

In one embodiment, the earbud may further include a battery 6 that is disposed in the cavity 20, and that is electrically coupled to the speaker 41 and/or the infrared sensor 31. In one embodiment, the battery 6 may be configured as a rechargeable battery. In one embodiment, the earbud further includes a printed circuit board 7 that is disposed in the rear housing part 22 of the housing 2, and that is electrically coupled to the speaker 41 and/or the infrared sensor 31.

When a diaphragm of the speaker 41 oscillates, air particles on a diaphragm surface of the diaphragm are driven to vibrate. After gaining an initial velocity and kinetic energy from the diaphragm, the air particles would initiate a multi-directional sound propagation process in the cavity 20. If an obstacle is located on a path where the air particles moves, sound quality of the earbud will be degraded due to reflection, interference, and reverberation of the sound waves propagating on the path. The funnel-shaped sound waveguide 42 according to the disclosure functions to alleviate these sound quality degradation factors.

The funnel-shaped sound waveguide 42 enhances the sound quality in three aspects. Regarding the first aspect, the tapered sound collection space 422 of the sound waveguide 42 assists the sound waves radiating from the speaker in multi-directions to travel in the direction toward the sound output space 424 and to reach the eardrum without encountering any obstruction. Therefore, the sound waves would not be distorted by other components in the cavity 20. Regarding the second aspect, the configuration of the funnel-shaped sound waveguide 42 confines the flow of the sound waves and prevents energy dissipation caused by scattering of sounds, so as to increase the total kinetic energy of the output sound waves. According to the principles of acoustics, an increase in kinetic energy of sound flow leads to an increase in sound pressure level. Regarding the third aspect, the tapered sound collection space 422 of the sound waveguide 42 increases a sound flow speed of the oscillating air particles in the sound output space 424. Therefore, when the sound waves generated by the speaker 41 flow through the tapered sound collection space 422 of the sound waveguide 42 and exit the sound waveguide 42 via the sound output space 424, due to sectional diameter being decreased, the speed of the air particles at an outlet opening of the sound output space 424 distal from the sound collection space 422 would be much greater than the initial speed of the air particles at the diaphragm of the speaker 41. Such increase in air flow speed at the outlet opening of the funnel-shape sound waveguide 42 thus enhances the sound pressure level in an audible frequency range. In a low frequency range, the increase in flow speed would greatly increase harmonic oscillating amplitude of the air particles. According to the principles of acoustics, the sound pressure level is proportional to oscillation amplitude. Therefore, the increase in sound pressure level in the low frequency range is more significant due to the presence of the sound waveguide 42. With regard to the characteristic of sound pressure level in the low frequency range, in a conventional earbud, low-speed air particles induced by small oscillation amplitude produces a low sound pressure level measured in a vicinity of the diaphragm of the speaker of the conventional earbud. The sound pressure level may even decrease in the low frequency range when the speaker radiates sound waves in an open space. However, in the earbud according to this disclosure, by virtue of the tapered sound collection space 422, the speed of air particles flowing through the funnel-shaped sound waveguide 42 is significantly increased. In contrast, in a high frequency range, the same increase in the speed of the air particles can only contribute a small increase in the oscillation amplitude, which leads to a slight increase of sound pressure level. Thereby, the increase of sound pressure level in the low frequency range is more significant than that in the high frequency range.

Figure 5:
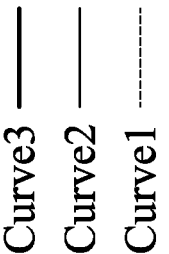
FIG. 5 is a frequency response diagram illustrating magnitude of sounds generated by the embodiment.

To verify feasibility of the earbud according to the disclosure, a number of sound pressure level tests were conducted under a testing condition in accordance with International Standard IEC-60268-7. In the tests, the sound pressure levels resulting from various sound waves guide devices (e.g., the funnel-shaped sound waveguide 42 of this disclosure) were measured. Referring to FIG. 5, three sound pressure level curves are shown for comparison, in which: Curve 1 is depicted by a broken line, Curve 2 is depicted by a thin solid line, and Curve 3 is depicted by a thick solid line. The sound wave guide device for Curve 1, which is commercially used by a well-known earphone company, is a circular plate with a thickness of 1 millimeter and a diameter of 10 millimeters formed with a centrally-located circular hole with a diameter of 2.5 millimeters. A gap between the circular plate and a speaker diaphragm cooperating with the sound wave guide device for Curve 1 is 1.5 millimeters. The sound wave guide device for Curve 2 is the funnel-shaped sound waveguide 42 of this disclosure with the following specific parameters: D1=10 millimeters, D2=2.5 millimeters, H=3.0 millimeters, and A=4.0 millimeters. The sound guiding device for Curve 3 is the funnel-shaped sound waveguide 42 of this disclosure with the following specific parameters: D1=10 millimeters, D2=2.0 millimeters, H=3.0 millimeters, and A=2.5 millimeters. A comparison among the three sound pressure level curves shows that both of the funnel-shapes sound waveguides 42 of the present disclosure are able to produce higher sound pressure levels within the audible frequency range. The difference between Curves 2 and 3 indicates that the geometric parameters may significantly affect performance of the funnel-shapes sound waveguides 42. To attain good performance of the sound waveguides 42 in this disclosure, it is suggested that the values of the geometric parameters be selected from the following intervals: $0.15 < D2/D1 < 0.35$; $0.12 < H/D1 < 0.5$; and $0.10 < A/D1 < 0.6$.

In summary, the earbud according to the disclosure defines an infrared radiation path and a sound wave path therein that are separated from each other and that respectively permit infrared radiation and sound waves to travel therethrough. As such, the thermometer module 3 is able to accurately determine the body temperature of the user, and the sound quality of the earbud may not be adversely affected. In addition, by virtue of the inner surrounding surface of the optical waveguide 32 being plated with a gold layer, the infrared reflection within the optical waveguide 32 is enhanced, and so the accuracy of the thermometer module 3 is enhanced. Moreover, by virtue of the funnel-shaped sound waveguide 42, the increase in sound pressure level of earbud according to the disclosure in the low frequency range is more significant.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An earbud adapted to be inserted into an ear canal of a user, comprising:

a housing defining a cavity and a passageway therein, the passageway being in spatial communication with the cavity, and having a passageway opening that is distal from the cavity and that is in spatial communication with the ear canal;

a thermometer module disposed in the housing, and adapted to receive infrared radiation from an eardrum of the user via the passageway to determine a body temperature of the user; and a speaker module disposed in the housing, and operable to generate sound waves that travel through the passageway toward the eardrum, the speaker module cooperating with the housing and the thermometer module to define an infrared radiation path and a sound wave path within the passageway that are separated from each other and that are for the infrared radiation from the eardrum and the sound waves generated by the speaker module to respectively travel therethrough, wherein the speaker module includes a speaker and a sound waveguide, the speaker being disposed in the cavity, the sound waveguide being substantially disposed in the cavity and extending into the sound wave path, and wherein the sound waveguide is funnel-shaped, and has a cone portion and a tube portion connected to the cone portion, the cone portion being located in the cavity, and tapering toward the passageway, the tube portion being connected to a tapered end of the cone portion, and extending into the passageway, the speaker being disposed at one side of the sound waveguide opposite to the passageway.

2. The earbud as claimed in claim 1, wherein the thermometer module includes a tubular optical waveguide that is disposed in the passageway and that defines the infrared radiation path therein, an inner surrounding surface of the optical waveguide being plated with a gold layer.

3. The earbud as claimed in claim 1, wherein the thermometer module includes a tubular optical waveguide that is disposed in the passageway and that defines the infrared radiation path therein, the optical waveguide occupying a minor portion of the passageway.

4. The earbud as claimed in claim 3, wherein a major portion of the passageway serves as the sound wave path.

5. The earbud as claimed in claim 1, wherein the thermometer module includes a tubular optical waveguide that is disposed in the passageway and that defines the infrared radiation path therein, the optical waveguide having an inlet opening that is disposed adjacent to the passageway opening and that permits the infrared radiation from the eardrum to enter the optical waveguide therethrough, and an outlet opening that is distal from the passageway opening.

6. The earbud as claimed in claim 5, wherein the inlet opening of the optical waveguide occupies a minor portion of the passageway opening.

7. The earbud as claimed in claim 5, wherein the thermometer module further includes an infrared filter that covers the inlet opening of the optical waveguide.

8. The earbud as claimed in claim 7, wherein the infrared filter is made of one of crystalline silicone and an infrared transparent polymer.

9. The earbud as claimed in claim 1, wherein the thermometer module includes a tubular optical waveguide that is disposed in the passageway and that defines the infrared radiation path therein, the optical waveguide being fixed to a radially outer side of the passageway.

10. The earbud as claimed in claim 1, wherein the cone portion of the sound waveguide defines a sound collection space therein that tapers toward the tube portion, the sound collection space having an inlet opening that is distal from the tube portion and that resides in a first imaginary plane, and an outlet opening that is proximate to the tube portion and that resides in a second imaginary plane parallel to the first imaginary plane.

11. The earbud as claimed in claim 10, wherein the inlet opening and the outlet opening of the sound collection space are circular, a diameter of the outlet opening of the sound collection space being smaller than that of the inlet opening.

12. The earbud as claimed in claim 10, wherein the sound collection space is axisymmetric.

13. The earbud as claimed in claim 10, wherein the sound collection space is asymmetric.

14. The earbud as claimed in claim 1, wherein the cone portion of the sound waveguide defines a sound collection space therein that tapers toward the tube portion, the sound collection space having an inlet opening that is distal from the tube portion and an outlet opening that is proximate to the tube portion, the inlet opening having a first diameter and the outlet opening having a second diameter, the first diameter being greater than the second diameter, wherein the speaker has a first end proximate to the tube portion and a second end distal from the tube portion, the first end of the speaker being located closer to the inlet opening than to the outlet opening.

* * * * *